(12) United States Patent
Sah et al.

(10) Patent No.: US 8,489,265 B2
(45) Date of Patent: Jul. 16, 2013

(54) METHOD AND ENGINE STABILITY CONTROL SYSTEM FOR A HYBRID ELECTRIC VEHICLE

(75) Inventors: Jy-Jen F. Sah, West Bloomfield, MI (US); Robert L. Morris, Milford, MI (US); Pinaki Gupta, Wixom, MI (US); Gil J. Mendoza, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 192 days.

(21) Appl. No.: 13/029,672

(22) Filed: Feb. 17, 2011

(65) Prior Publication Data

US 2012/0089282 A1   Apr. 12, 2012

Related U.S. Application Data

(60) Provisional application No. 61/390,353, filed on Oct. 6, 2010.

(51) Int. Cl.
*B60L 9/00* (2006.01)
*B60L 11/00* (2006.01)
*G05D 1/00* (2006.01)
*G05D 3/00* (2006.01)
*G06F 7/00* (2006.01)
*G06F 17/00* (2006.01)

(52) U.S. Cl.
USPC .............................. 701/22; 701/71

(58) Field of Classification Search
USPC ................... 701/22, 51, 53, 69; 477/3, 5, 83, 477/156; 475/5, 31, 32, 66, 83, 131, 136, 475/142, 221; 303/10, 113.2; 180/6.3, 6.44, 180/6.5, 11, 14.2, 22, 65.1, 65.21, 65.22, 180/65.23, 65.235, 65.28, 65.285
See application file for complete search history.

(56) References Cited

U.S. PATENT DOCUMENTS 6,070,680 A * 6/2000 Oyama ....................... 180/65.25
6,549,840 B1 * 4/2003 Mikami et al. .................. 701/69

* cited by examiner

*Primary Examiner* — Thomas Black
*Assistant Examiner* — Isaac Smith
(74) *Attorney, Agent, or Firm* — Quinn Law Group, PLLC

(57) ABSTRACT

A method for controlling a hybrid electric vehicle having a control system, a traction motor, and an engine includes generating an activation signal during a predetermined vehicle maneuver. The predetermined vehicle maneuver is a threshold hard braking maneuver on a surface having a low coefficient of friction. The method also includes processing the activation signal using the control system, and using the traction motor to command an injection or a passing of a feedforward torque to the driveline of the vehicle. The feedforward torque is in the same direction as the engine torque, and prevents a drive shaft of the engine from spinning in reverse during the maneuver. The method may include generating the activation signal in response to detecting an active state of the ABS controller. A hybrid electric vehicle includes an engine, a traction motor, and a control system configured to execute the above method.

13 Claims, 1 Drawing Sheet

METHOD AND ENGINE STABILITY CONTROL SYSTEM FOR A HYBRID ELECTRIC VEHICLE

CROSS-REFERENCE TO RELATED APPLICATIONS

This application claims priority to and the benefit of U.S. Provisional Patent Application Ser. No. 61/390,353, which was filed on Oct. 6, 2010, and which is hereby incorporated by reference in its entirety.

TECHNICAL FIELD

The present invention relates to a method and engine stability control system for a hybrid electric vehicle.

BACKGROUND

Vehicle drive wheels can lock up during certain vehicle maneuvers, for example when executing a hard braking maneuver on a low-friction surface. This in turn can trigger a state activation in an antilock braking system (ABS) controller. To unlock the drive wheels, the active ABS controller automatically commands high frequency brake pressure pulsations.

SUMMARY

A method is disclosed herein for use aboard a hybrid electric vehicle having a control system, a traction motor, and an engine. The drive shaft of the engine may rotate in reverse during certain vehicle maneuvers. The present method therefore includes automatically generating an activation signal during a predetermined vehicle maneuver, and in particular during a hard braking maneuver on a threshold low coefficient of friction surface. The method further includes injecting or passing a feed-forward torque from the traction motor, or from multiple traction motors if the vehicle is so configured, to the driveline. The feed-forward torque is passed in the same direction as engine torque to prevent the drive shaft from spinning in reverse during the maneuver.

A hybrid electric vehicle includes an internal combustion engine configured to output an engine torque via a driveshaft of the engine, a first and a second traction motor, and a control system. The control system is configured for detecting the predetermined vehicle maneuver noted above, and for selectively injecting the feed-forward torque to prevent the driveshaft from spinning in reverse during the maneuver.

A control system for a hybrid vehicle includes at least one vehicle control module in communication with the engine and the traction motors. The control module is used to detect the predetermined vehicle maneuver, to generate an activation signal in response to the detected predetermined vehicle maneuver, and to inject the feed-forward torque to the driveline as noted above.

The above features and advantages, and other features and advantages of the present invention are readily apparent from the following detailed description of the best modes for carrying out the invention when taken in connection with the accompanying drawings.

DETAILED DESCRIPTION

Figure 1:
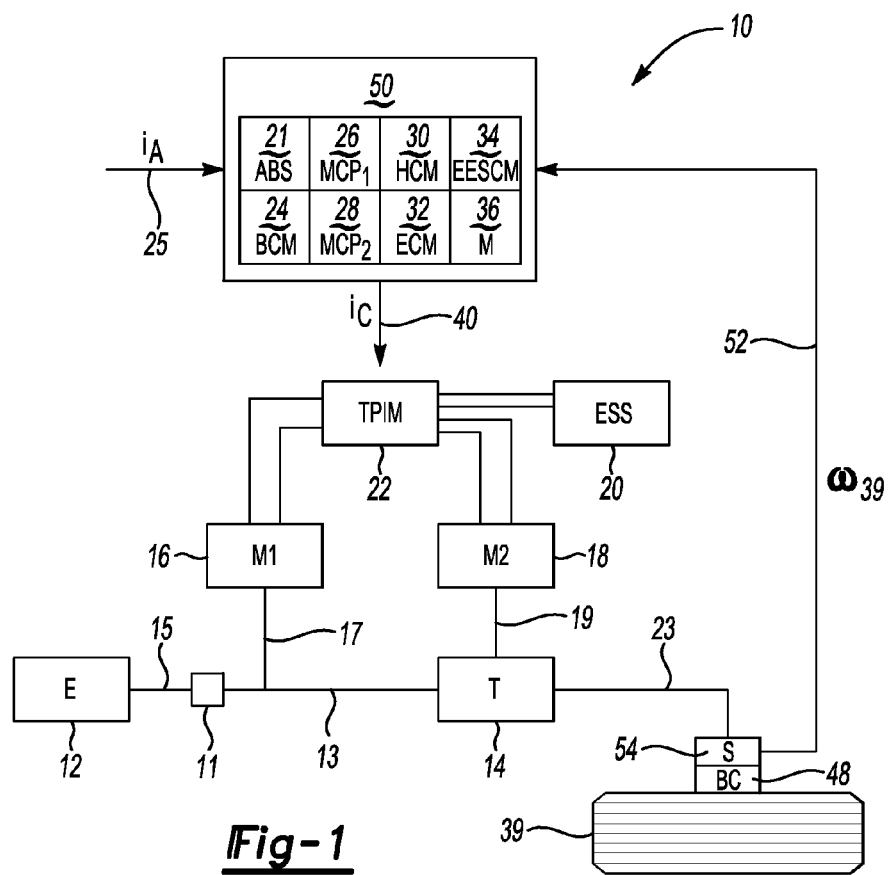
FIG. 1 is a schematic illustration of a hybrid electric vehicle having a distributed control system which executes the present control method during a threshold vehicle maneuver.

A hybrid electric vehicle 10 is shown in FIG. 1. The vehicle 10 includes a distributed control system (C) 50 configured to selectively control the stability of an internal combustion engine (E) 12 during a predetermined vehicle maneuver. The control system 50 does this by executing a method 100 (see FIG. 2) via a set of control signals ($i_C$)(arrow 40). The control system 50 executes the method 100 in response to an activation signal ($i_A$)(arrow 25) that is indicative of the predetermined vehicle maneuver, as explained in detail below. The control signals (arrow 40) are automatically generated and/or processed by various portions of the control system 50, and then used to prevent engine spin from occurring during the maneuver.

The predetermined vehicle maneuver may be embodied as any vehicle event triggering an activation of an antilock braking system (ABS) controller 21, or triggering equivalent ABS capabilities resident in another vehicle control module. The predetermined vehicle maneuver may include a hard braking event executed on a road surface having a threshold low coefficient of friction ($\mu$), i.e., a low-$\mu$ surface. Typical low-g surfaces include wet, icy, oily, or gravel-coated road surfaces. If a hard braking maneuver, e.g., a driver stepping forcefully on a brake pedal, is executed on a surface that is slippery enough to cause an activation of the ABS controller 21, this is considered herein to be a threshold low-$\mu$ surface. The control system 50 responds to such a maneuver by selectively injecting or passing a feed-forward torque from a traction motor (M1) 16 and/or (M2) 18 to the vehicle's driveline in the direction of engine torque to prevent reverse engine spin from occurring, i.e., reverse rotation of a driveshaft 15.

The vehicle 10 may include the engine 12, a transmission (T) 14, and the traction motors 16 and 18, with the fraction motors operating as fast actuators. Other vehicle embodiments may use a single fraction motor. The transmission 14 can be selectively powered by the engine 12, the traction motor 16, the traction motor 18, or any combination thereof depending on the transmission operating mode or state, as determined by a shift control algorithm or logic (not shown). The vehicle 10 includes an energy storage system (ESS) 20, e.g., a rechargeable battery pack, which is electrically connected to the traction motors 16 and 18 via a traction power inverter module (TPIM) 22. The transmission 14 has multiple operating modes or states, each with an associated driveline inertia level.

The ESS 20 may be recharged during operation of the vehicle 10 via regenerative braking, and may be optionally recharged via an offboard power supply (not shown) when the vehicle is idle when configured as a plug-in hybrid electric vehicle. As understood in the art, a power inverter inverts electrical power from alternating current (AC) to direct current (DC), and vice versa, to enable use of a multi-phase AC permanent magnet or induction devices, i.e., the traction motors 16 and 18, with a DC battery, e.g., the ESS 20.

The control system 50 is used aboard the vehicle 10 to maintain control over the engine 12, the transmission 14, and each of the traction motors 16 and 18. The control signals (arrow 40) are communicated to the affected vehicle systems when needed, e.g., via a controller area network (CAN), serial bus, data routers, and/or other suitable means. The control system 50 may include as many different vehicle control modules as are required to maintain optimal control, including the ABS controller 21, a braking control module (BCM) 24, motor control processors (MCP) 26 and 28, a hybrid control module (HCM) 30, an engine control module (ECM) 32, and a battery or ESS control module (ESSCM) 34. For simplicity and clarity, the control system 50 is represented in FIG. 1 as a single device, although separate controllers, either in functionality or in structure, may be used within the scope of the present invention.

The hardware components of the distributed control system 50 of FIG. 1 can include one or more digital computers or host machines each having a microprocessor or central processing unit, read only memory (ROM), random access memory (RAM), electrically-programmable read only memory (EPROM), a high-speed clock, analog-to-digital (A/D) and digital-to-analog (D/A) circuitry, and input/output circuitry and devices (I/O), as well as appropriate signal conditioning and buffer circuitry. Each set of algorithms or code resident in the control system 50 or readily accessible thereby, including any algorithms or computer code needed for executing the present method 100 as explained below with reference to FIG. 2, can be stored in tangible/non-transitory computer-readable memory (M) 36, and executed by a host machine or other suitable hardware portions of the control system 50 as needed to provide the disclosed functionality.

The engine 12 is capable of selectively generating a sufficient amount or level of engine torque for rotating the drive shaft 15. An input assembly 11 can be used to connect the engine 12 to an input member 13 of the transmission 14. The specific configuration of input assembly 11 can vary with the vehicle design. For example, the input assembly 11 may be a clutch and damper assembly that selectively connects and disconnects the engine 12 from the vehicle driveline as needed, or it can be a grounding clutch or brake that selectively brakes the drive shaft 15 when the engine is not running.

Each of the traction motors 16 and 18 has a respective motor output shaft 17 and 19. Thus, input torque to the transmission 14 may be generated and delivered by the engine 12 as engine torque and/or the traction motors 16, 18 as motor torque. Output torque from the transmission 14 can be delivered to a set of drive wheels 39 via an output member 23. The actual configuration of the transmission 14 can vary depending on the design of the vehicle 10, and may include one or more planetary gear sets, an electrically variable transmission, rotating clutches, braking clutches, hydraulic or electromechanical activation components, etc.

As noted above, the distributed control system 50 shown in FIG. 1 is configured to execute the present method 100 (see FIG. 2) to optimize engine stability at low vehicle speeds during a threshold vehicle maneuver, e.g., a maneuver in which the ABS controller 21 enters an active state. Such a maneuver may be embodied as the hard braking maneuver on a threshold low-pt surface as noted above, wheel lock up upon hitting an obstacle such as a pothole, or any other event in which the ABS controller 21 becomes active. This in turn results in generation of the activation signal (arrow 25), whether from the ABS controller 21 or from another control module.

Major components of a typical ABS system include a wheel speed sensor (S) 54 positioned in close proximity to each drive wheel 39, and any required hydraulic, electric, and/or electromechanical brake components 48. In one possible embodiment, the brake components 48 can include brake discs, calipers, drums, pads, rotors, etc., as understood in the art, as well as any fluid or electromechanical activation devices. The wheel speed sensors 54 collectively provide wheels speed signals ($\omega_{39}$)(arrow 52) to the BCM 24. When any of the drive wheels 39 are approaching a locked state, the brake components (BC) 48 are automatically controlled to individually modulate the braking pressure applied at each wheel, thus preventing the wheels from locking up or, barring that, subsequently unlocking any locked wheels.

The distributed control system 50 shown in FIG. 1 can also receive and process various other input signals, including but not limited to output torque and rotational speed of the engine 12, motor torque, torque direction, and rotational speed of the traction motors 16 and 18, throttle or accelerator position, etc. The control system 50, and in particular the HCM 30, then achieves a targeted gear ratio or transmission operating mode or state in the most efficient manner by coordinating engine speed and motor speeds in a manner that is dependent upon the current transmission operating strategy.

Figure 2:
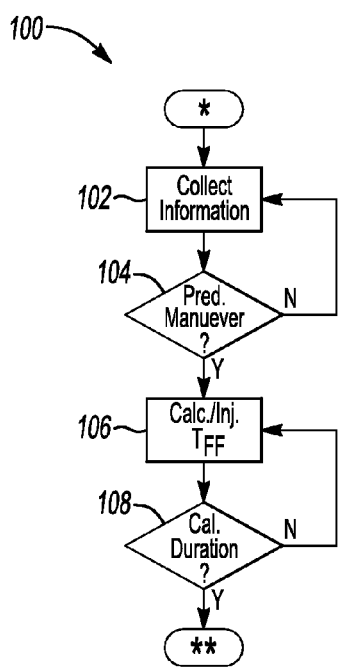
FIG. 2 is a flow chart describing a method for controlling engine stability aboard the hybrid electric vehicle of FIG. 1 during the threshold vehicle maneuver.

Referring to FIG. 2, method 100 may be executed by the control system 50 of FIG. 1 to address the condition in which the predetermined vehicle maneuver causes the drive wheels 39 to lock up, which may in turn activate the ABS controller 21. Heavy motor inertia complicates the ability of any ABS-related portions of the distributed control system 50 to unlock the drive wheels 39. Additionally, under certain transmission operating modes at low speeds there is a chance that, when executing a predetermined vehicle maneuver, the engine 12 shown in FIG. 1 will rotate or spin backward, at least momentarily. The present method 100 is therefore executed by the control system 50 to prevent such engine spin and thus protect the engine 12 during this maneuver.

Beginning with step 102, and referring to the structure of the vehicle 10 shown in FIG. 1 and explained above, the distributed control system 50 collects a preliminary set of vehicle information. Step 102 may include processing braking signals, vehicle speed, and/or wheel speeds via the BCM 24 or another suitable module, calculating wheel slip via the wheel speed signals 52, determining the activation state of the ABS controller 21, transmission output speed, etc. The method 100 then proceeds to step 104.

At step 104, the control system 50 determines whether or not the information collected at step 102 corresponds to a predetermined vehicle maneuver, such as a threshold hard braking maneuver executed on a low-µ surface. Step 104 may take place in the BCM 24 or other suitable control module, and may include comparing information from step 102 to calibrated thresholds. Other factors that could be evaluated at step 104 include a rapid deceleration of the input member 13 of the transmission 14 in conjunction with a vehicle speed and/or wheel speeds that remain relatively constant, within a calibrated range, or that do not otherwise decrease at a rate that would be indicated by such rapid braking.

If the predetermined vehicle maneuver is not detected at step 104, the method 100 repeats step 102. Otherwise, the method 100 includes passing the results of step 104 to the HCM 30 from the BCM 24 or other control module, if used, over a serial data link or other suitable high-speed communications channel. The method 100 then proceeds with step 106.

At step 106, the control system 50 calculates and injects a suitable amount of feed-forward torque ($T_{FF}$) to the vehicle driveline, in the direction of engine torque, using the traction motors 16 and/or 18. As the engine 12 is a slow actuator relative to the actuation speed of the traction motors 16 and 18, it can take considerable time to produce sufficient engine torque. A rapid event such as driveline load following a threshold hard braking event on a low-µ surface could cause the engine 12 to spin backward before the engine can protect itself. This may be particularly problematic when the engine 12 is turned off. Torque is thus injected to the driveline at step 106 in the direction of engine torque via the fast-actuating traction motors 16 and/or 18 in order to prevent the engine 12 from spinning backward, and thus to control engine stability.

The amount of feed-forward torque may be calculated, for example, in a manner that depends on the vehicle speed, engine speed, transmission operating mode or state, etc. The feed-forward torque may be calculated using calibrated gains or via any other suitable approach. The method 100 then proceeds to step 108.

At step 108, the HCM 30 verifies whether a calibrated duration has elapsed. If so, the feed-forward torque is terminated, and the method 100 is finished. If not, steps 106 and 108 may be repeated in a closed loop until the calibrated duration has elapsed.

While the best modes for carrying out the invention have been described in detail, those familiar with the art to which this invention relates will recognize various alternative designs and embodiments for practicing the invention within the scope of the appended claims.

The invention claimed is:

1. A method for controlling a hybrid electric vehicle having a control system with an anti-lock braking system (ABS) controller, a traction motor, and an engine having a driveshaft that is connected to the traction motor, and that, when the engine is running, generates an engine torque in a predetermined direction, the method comprising:
   generating an activation signal during a predetermined vehicle maneuver via the control system, wherein the predetermined vehicle maneuver is an activation of the ABS system via a threshold hard braking maneuver on a surface having a threshold low coefficient of friction;
   commanding, via the control system, an injection or a passing of a feed-forward torque from the traction motor to the driveline of the vehicle in the predetermined direction of the engine torque; and
   discontinuing the injection or passing of the feed-forward torque from the traction motor when a calibrated duration has elapsed;
   wherein the feed-forward torque prevents a drive shaft of the engine from spinning in reverse relative to the predetermined direction during the predetermined vehicle maneuver.

2. The method of claim 1, wherein the control system includes a braking control module (BCM), a plurality of drive wheels, and an equal plurality of wheel speed sensors, and wherein detecting a predetermined vehicle maneuver includes calculating, via the BCM, a slip speed of each of the drive wheels using speed signals from the wheel speed sensors.

3. The method of claim 1, wherein the vehicle includes a pair of traction motors, and wherein the feed-forward torque is injected via each of the pair of traction motors.

4. A hybrid electric vehicle comprising:
   an internal combustion engine having a driveshaft, wherein the engine is configured to produce an engine torque via the driveshaft in a predetermined direction when the engine is running;
   a traction motor that is connected to the driveshaft; and
   a control system which controls engine stability of the vehicle during a predetermined vehicle maneuver, wherein the predetermined vehicle maneuver is an activation of the ABS system via a hard braking maneuver on a surface having a threshold low coefficient of friction;
   wherein the control system is configured for detecting the predetermined vehicle maneuver, and for commanding an injection or a passing of a feed-forward torque to the driveline in the predetermined direction of the engine torque, via the traction motor, to prevent a driveshaft of the engine from spinning in reverse during the maneuver relative to the predetermined direction, and discontinuing the injection or passing of the feed-forward torque from the traction motor when a calibrated duration has elapsed.

5. The vehicle of claim 4, wherein the control system includes a braking control module configured for detecting the predetermined vehicle maneuver, and a motor control processor configured for injecting the feed-forward torque.

6. The vehicle of claim 4, further comprising a plurality of wheel speed sensors, wherein the control system is configured for detecting the predetermined vehicle maneuver by processing speed signals from the wheel speed sensors.

7. The vehicle of claim 4, further comprising a pair of traction motors, wherein the feed-forward torque is injected via each of the traction motors.

8. A control system for a hybrid vehicle having an internal combustion engine with a driveshaft producing, when the engine is running, an engine torque in a predetermined direction, a first traction motor connected to the driveshaft, and a second traction motor, wherein the control system includes a host machine that is configured for:
   detecting an activation of the ABS controller, including detecting a threshold hard braking maneuver on a surface having a threshold low coefficient of friction as a predetermined vehicle maneuver;
   generating an activation signal in response to the detected predetermined vehicle maneuver; and
   commanding an injection or passing of a feed-forward torque to the driveline in the predetermined direction of the engine torque, via at least one of the traction motors, to prevent a driveshaft of the engine from spinning in reverse relative to the predetermined direction during the maneuver.

9. The control system of claim 8, wherein the host machine includes a braking control module configured for detecting the predetermined vehicle maneuver and a motor control processor configured for commanding the injection of the feed-forward torque.

10. The control system of claim 8, further comprising a plurality of wheel speed sensors, wherein the host machine is configured for detecting the predetermined vehicle maneuver by processing speed signals from the wheel speed sensors.

11. The vehicle of claim 1, wherein the predetermined vehicle maneuver is an activation of the ABS system occurring when the engine is not running.

12. The vehicle of claim 4, wherein the predetermined vehicle maneuver is an activation of the ABS system occurring when the engine is not running.

13. The control system of claim 8, wherein the predetermined vehicle maneuver is an activation of the ABS system occurring when the engine is not running.

* * * * *